United States Patent
Gross et al.

(10) Patent No.: US 7,909,275 B2
(45) Date of Patent: Mar. 22, 2011

(54) SELF-CONTAINED SHREDDER ASSEMBLY FOR REDUCING AND SIZING MATERIAL

(75) Inventors: Thomas R. Gross, Weidman, MI (US); Earl R. Smith, Mt. Pleasant, MI (US)

(73) Assignee: Dynamic Manufacturing, LLC, Minneapolis, MN (US)

( * ) Notice: Subject to any disclaimer, the term of this patent is extended or adjusted under 35 U.S.C. 154(b) by 175 days.

(21) Appl. No.: 12/291,502

(22) Filed: Nov. 10, 2008

(65) Prior Publication Data
US 2009/0140088 A1   Jun. 4, 2009

Related U.S. Application Data

(60) Provisional application No. 61/002,608, filed on Nov. 8, 2007.

(51) Int. Cl.
*B02C 18/22* (2006.01)

(52) U.S. Cl. .... 241/55; 241/74; 241/101.76; 144/162.1; 144/220

(58) Field of Classification Search .............. 241/55, 241/101.76, 92, 280, 73, 74; 144/162.1, 144/172, 220
See application file for complete search history.

(56) References Cited

U.S. PATENT DOCUMENTS

| | | | |
|---|---|---|---|
| 654,901 A | 7/1900 | Lanpher | |
| 875,447 A | 12/1907 | Miley | |
| 2,854,047 A | 9/1958 | Schmidt, Jr. | |
| 3,875,984 A | 4/1975 | Plough | |
| 3,944,147 A | 3/1976 | Pletcher | |
| 3,989,198 A | 11/1976 | Blasko | |
| 4,009,837 A | 3/1977 | Schnyder | |
| 4,037,799 A | 7/1977 | Urban | |
| 4,077,450 A | 3/1978 | Ackerman | |
| 4,135,563 A | 1/1979 | Maucher | |
| 4,162,769 A | 7/1979 | Lapointe | |
| 4,260,114 A | 4/1981 | Herder | |
| 4,738,402 A | 4/1988 | Downie | |
| 4,907,750 A | 3/1990 | Seifert | |
| 4,958,775 A | 9/1990 | Arasmith | |
| 5,005,620 A | 4/1991 | Morey | |
| 5,209,278 A | 5/1993 | Carpenter et al. | |
| 5,240,190 A | 8/1993 | Johnson | |
| 5,381,970 A * | 1/1995 | Bold et al. | 241/55 |
| 5,390,862 A | 2/1995 | Eglin | |
| 5,692,548 A | 12/1997 | Bouwers et al. | |
| 5,836,528 A | 11/1998 | Hilgarth | |
| 6,032,707 A | 3/2000 | Morey et al. | |
| 6,036,125 A | 3/2000 | Morey et al. | |
| 2003/0201350 A1 | 10/2003 | Garl | |
| 2006/0108463 A1 | 5/2006 | Gross et al. | |

OTHER PUBLICATIONS

"International Search Report", mailed Feb. 10, 2009.
"Written Opinion", mailed Feb. 10, 2009.

* cited by examiner

*Primary Examiner* — Mark Rosenbaum
(74) *Attorney, Agent, or Firm* — Dean B. Watson; Briggs and Morgan, P.A.

(57) ABSTRACT

A shredder having a sizing chamber and a reducing chamber for sizing and reducing material.

19 Claims, 4 Drawing Sheets

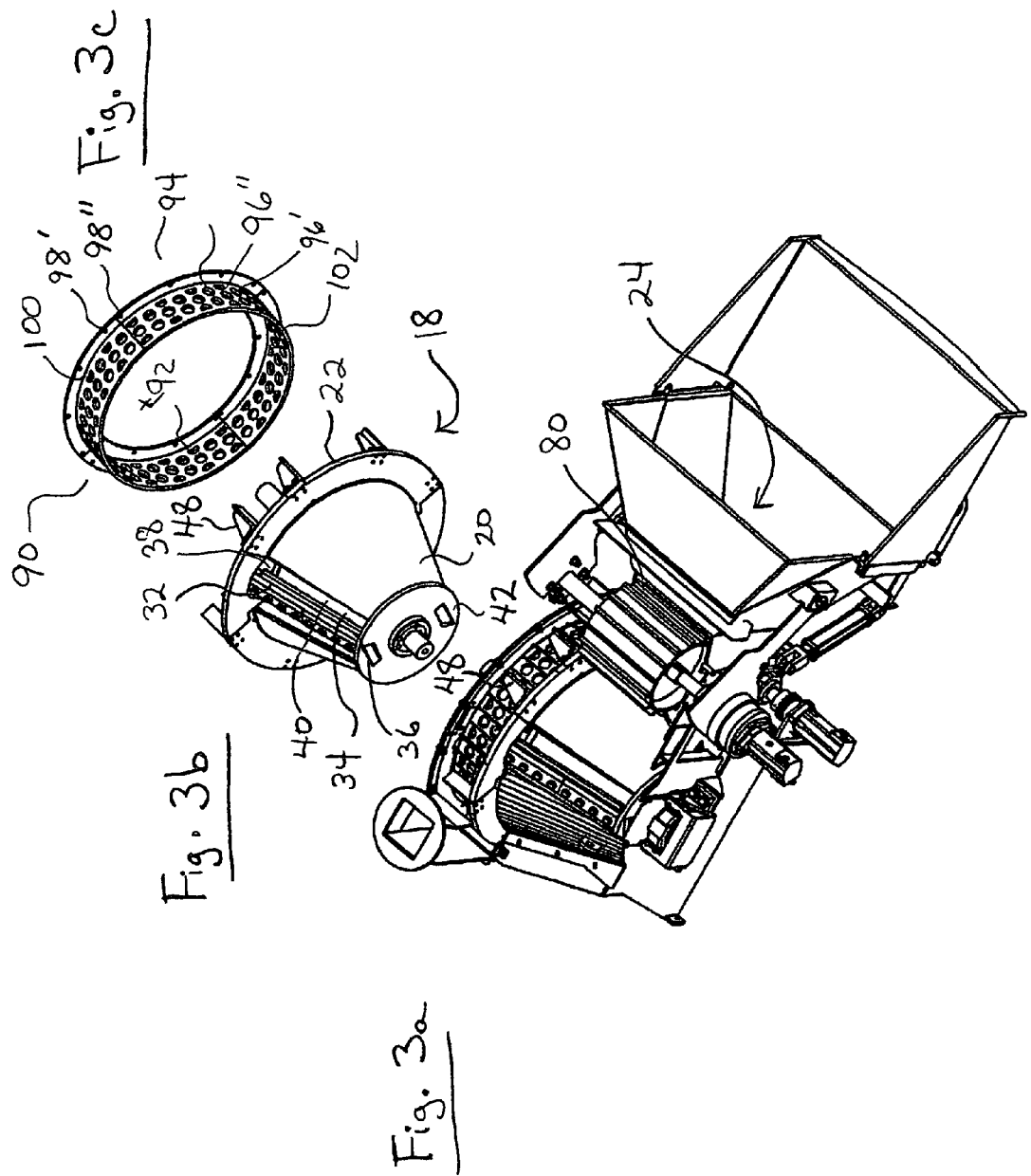

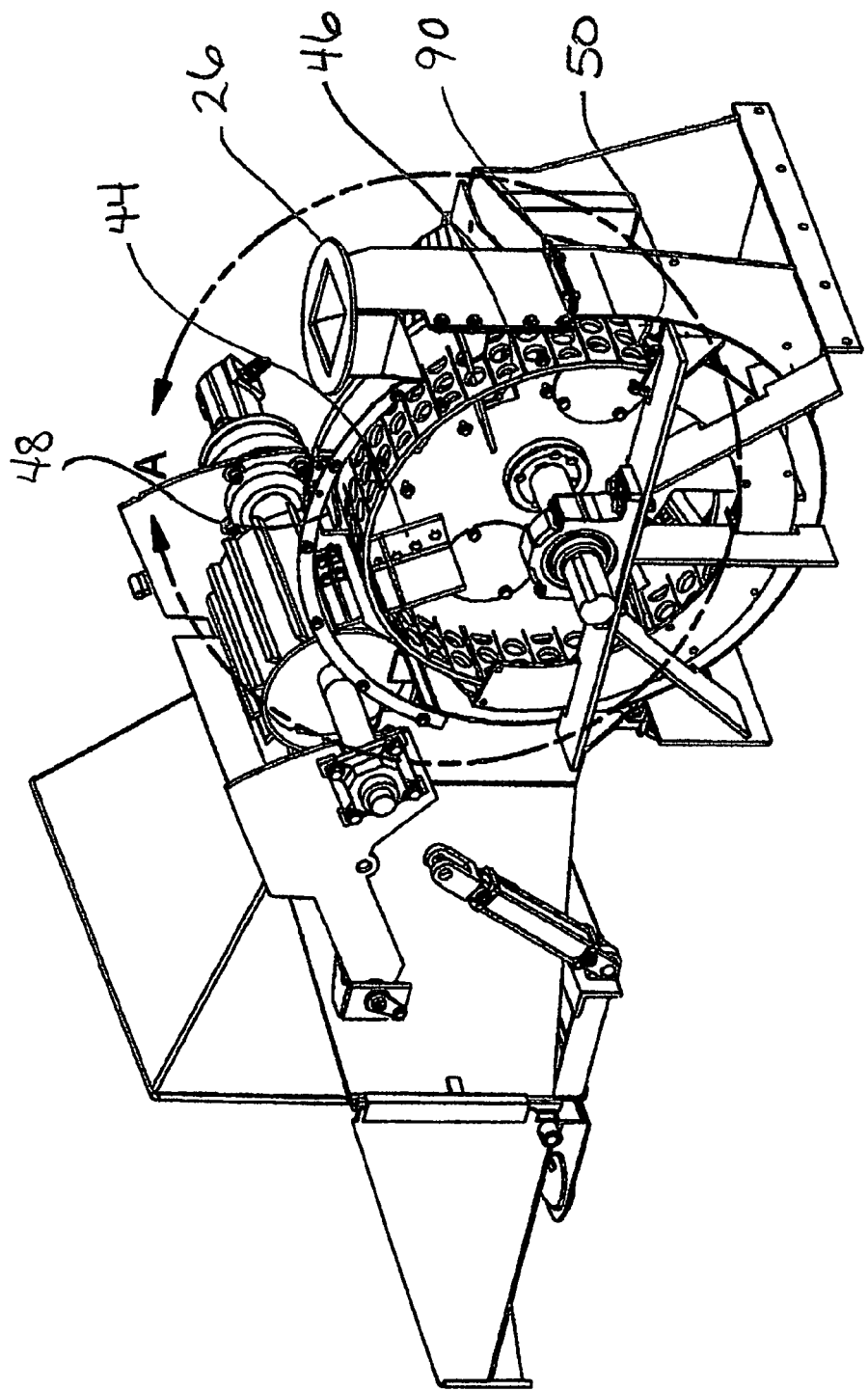

SELF-CONTAINED SHREDDER ASSEMBLY FOR REDUCING AND SIZING MATERIAL

CROSS-REFERENCE TO RELATED APPLICATIONS

The present invention relates to and is entitled to the benefit of the earlier filing date and priority of: U.S. provisional patent application No. 61/002,608, filed Nov. 8, 2007 and entitled "Self-contained Shredder Assembly For Reducing And Sizing Material", by Gross et. al., the disclosure of which is hereby incorporated herein by reference.

BACKGROUND OF THE INVENTION

I. Field of the Invention

The present invention relates to machines for reducing materials, including material made of wood or other fibrous materials, and more particularly to drum and disc chippers.

II. Description of the Background

Drum and disc chippers for reducing wood are generally known. New designs however are revolutionizing the industry, see for example U.S. Provisional Patent Application No. 60/269,653, filed Feb. 16, 2001, entitled "Wood Collection and Reducing Machine", U.S. Provisional Patent Application No. 60/286,477, filed Apr. 25, 2001, entitled "Wood Collection and Reducing Machine"; U.S. Non-provisional patent application Ser. No. 10/076,638 filed Feb. 16, 2002; U.S. Non-provisional patent application Ser. No. 10/232958 filed Aug. 31, 2002; U.S. Non-provisional patent application Ser. No. 10/237007 filed Sep. 7, 2002; of which are shown as publication numbers 20020113154, 20030062435, 20030071151, respectively, and entitled "Wood Collection and Reducing Machine", and U.S. Non-provisional patent application Ser. No. 11/266768 filed Nov. 2, 2005 and entitled "Drum Shredder With Flywheel or Discharge Assembly" having a publication number 20060108463 A1, the applications of which are by the same inventors hereof, the disclosures of which are all hereby incorporated herein by reference in their entirety.

In some operations first cut materials are sent to a second apparatus for resizing. Re-handling of materials can be time consuming, and the cost of buying and maintaining extra equipment is undesirable. Therefore, what is needed is a self-contained machine that can both reduce material and size it without the need for multiple machines.

SUMMARY OF THE INVENTION

The present invention comprises a machine for reducing and sizing material.

In a preferred embodiment there is disclosed a machine for reducing material which includes a reducing chamber in communication with a sizing chamber.

In another preferred embodiment there is disclosed a shredder for reducing and sizing material which includes a rotatable, tapered cutting drum that is impervious to reduced material so that the reduced material is carried externally of the drum and sideways into a sizing chamber.

In another preferred embodiment there is disclosed a machine for reducing and sizing material which utilizes a single drive for both reducing and sizing.

In another preferred embodiment there is disclosed a machine for reducing and sizing material with an optional sizing operation.

In another preferred embodiment, there is disclosed a self-contained machine which includes a separate reducing and sizing operation in one machine.

In still other embodiments there are disclosed various features which may be added to the machine for reducing and sizing material which may be combined together or used separately.

For a more complete understanding of the claimed invention, reference is now made to the accompanying drawings and detailed description of preferred embodiments. Throughout the several figures and views, like symbols refer to like elements.

BRIEF DESCRIPTION OF THE DRAWINGS

FIG. 3a is a perspective view of an embodiment of a machine as in FIG. 1 with parts of the assembly removed for ease of viewing;

FIG. 3b is a perspective view of an embodiment of a reducing element for reducing material shown separated from the machine shown in FIG. 3a;

FIG. 3c is a perspective view of an embodiment of a sizing element for reducing material shown separated from the machine shown in FIG. 3a; and FIG. 4 is an environmental, perspective view of an embodiment of a machine as in FIG. 1 with parts of the assembly removed for ease of viewing.

DETAILED DESCRIPTION OF THE PREFERRED EMBODIMENTS

Figure 1:
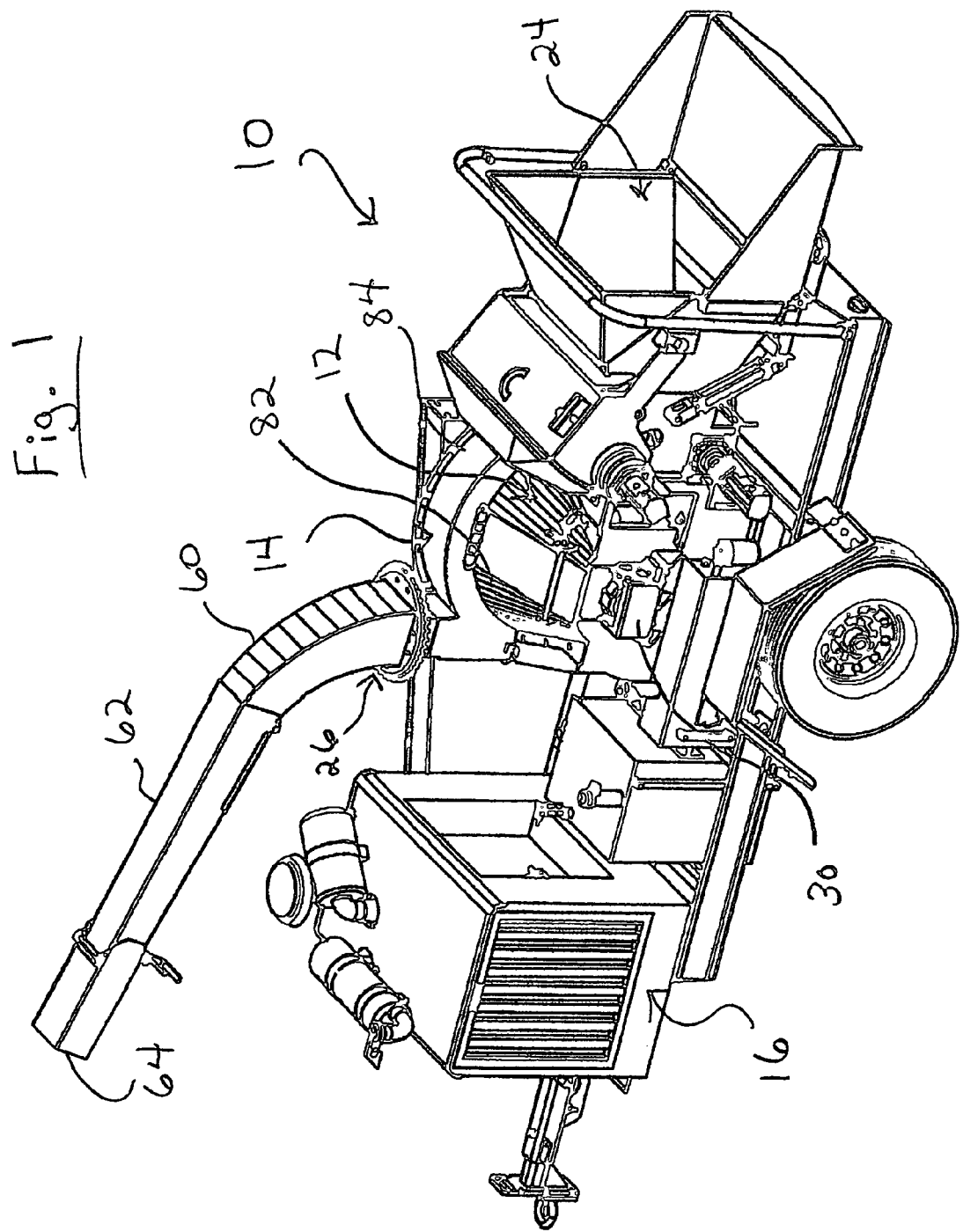
FIG. 1 is an environmental, perspective view of an embodiment of a machine having a reducing chamber and a sizing assembly.

Disclosed herein are preferred embodiments of a shredder for reducing and sizing material that have one or more novel features as presented in the embodiments below which may be combined or separated depending on the application as may be understood by one skilled in the art.

To affect material reduction the machine has a material reducing chamber. Within the material reducing chamber there is a reducing element, together providing means for reducing material. The reducing element is preferably a tapered cutting drum. Examples of tapered cutting drums that may be used in the material reduction chamber can be found in U.S. non-provisional patent application Ser. No. 11/266768 filed Nov. 2, 2005 and entitled "Drum Shredder With Flywheel or Discharge Assembly" having a publication number 20060108463 A1 by Gross et al., the disclosure of which is hereby incorporated herein by reference. A tapered cutting drum is one that has a cross-section with an outer diameter that is smaller than an outer diameter of another cross-section of said drum. Preferred drum shapes include conical and hourglass. The cutting drum may taper as a series of steps or may taper as a gradually tapering surface over any particular section of the drum, including the entire drum. As may be appreciated, a tapered drum may have a plurality of cutting regions. The first cutting region with a larger outer diameter has a speed faster than the second cutting region. The second cutting region with a smaller outer diameter has a slower rim speed, higher torque than the first region, which can provide a higher cutting force.

The tapered cutting drum may taper towards one end, both ends, towards the center, or any combination of the above. In a preferred embodiment the drum outer diameter tapers towards an end. An example of a drum with an outer diameter that tapers toward one end is a conical drum. In another preferred embodiment, the cutting drum has two ends and a middle section wherein the outer diameter of the drum tapers towards the middle section. A drum with an outer diameter that tapes toward the middle section may be provided as an hourglass shape. A tapered cutting drum preferably provides a plurality of cutting radii with increasing torque and cutting force along the cutting axis. As may be appreciated by the findings disclosed herein, cutting force and torque can be increased as drum diameter decreases.

The tapered cutting drum preferably has a wider section and a narrower section as measured by the drum diameter. The wider section of the cutting drum (that with a larger diameter) can provide a cut that is straighter than the cut provided by the narrower section (that which has a smaller diameter) of the tapered cutting drum. The narrower section of the cutting drum in turn can provide a cut that is more cupped or curved than that produced by the wider section of the drum. Thus, a tapered cutting drum can provide a compound cut wherein the section of the drum with a larger circumference cuts more down and through the material, while the section of the drum with a smaller circumference acts more to chisel and scoop the material. This compound cutting provides enhanced draw and improved cutting efficiency. The tapered cutting drum in combination with the positioning and shape of the anvil can also improve efficiency by producing shearing action.

The cutting drum is adapted to radially carry chips on the outside of the drum, and as such, may be essentially imperforate, impervious or impenetrable to reduced material so that chips may not pass radially inwardly through the outer wall or skin of the drum. A cutting drum adapted to radially carry chips on the outside of the drum may be adapted for carrying chips radially in any suitable manner, such as having a drum with a solid surface or imperforate skin, with small holes which are impenetrable by the reduced material, with a continuous outer surface that includes extended blades with a channel disposed beneath the blades, and/or by providing at least one channel in the surface of the drum for carrying chips. Preferably the cutting drum has a substantially uniform, smooth outer surface, other than the cutting implements, associated hardware, and channels.

The cutting drum may be hollow, essentially solid, or solid. However, it is noted that any channels in the surface of the drum are essentially imperforate to reduced material so that the surface of the drum still precludes reduced material from passing radially inwardly into the drum. A hollow cutting drum allows for making a larger cutting head with reduced weight, which can reduce material costs and provide ease of handling. A hollow center may also be used for fixing a drive shaft therein. A solid or essentially solid cutting drum provides a heavy member with increased stability and may also provide increased momentum so that chipping large branches does not hamper the speed of the drum or the cutting blade(s) during operation.

The cutting drum may be made of any suitable material, such as cast alloy, forged steel, cast iron, steel plate, other hard materials, etc. Preferably the drum has a skin or outer surface made of steel plate, the steel plate formed and welded on the inside to arrange the plates into a tapered drum.

In practice, wood or other material can be fed to a rotating drum where one or more cutting implements impact on the material. Lighter materials are quickly shredded by the impact of the cutting implements. Heavier branches will tend to move progressively along the incline of the tapered cutting drum to a higher torque portion thereof, which may be aided by gravity, by the design of the taper, the design of the cutting implements, the configuration of the cutting drum, or all of the above. The high torque, slower speed region of the tapered cutting drum can then be effectively utilized to reduce large branches or other materials with improved efficiency.

The cutting drum preferably has at least one cutting implement. The cutting implement may be any suitable reducing device. The reducing device is preferably selected based on the particular shredding operation being performed. Suitable cutting implements include: blades, spikes, fixed or swinging hammers, etc. In one embodiment, the cutting implements are blades disposed about the outer surface of the drum. A cutting blade is an elongated knife(s) or chisel(s) that extend(s) longitudinally along some portion of the cutting axis of the cutting drum. Blades are particularly good cutting implements for reducing wood. Each blade may be connected to the cutting drum at an acute angle relative to the surface thereof to enhance chipping and material draw into the shredder.

The cutting blade may be straight or curved with a straight or curve edge. Each cutting blade may have multiple edges so that the blade may be repositioned to provide a fresh, sharpened edge. The cutting implement is preferably removably attached to the drum. The cutting implement is preferably removably fixed to the drum with a blade keeper. Examples of blade keepers include a blocks or bearings that may be adapted to receive one or more bolts or other fasteners to hold the blades to the drum. Each cutting blade may be formed by combining multiple, smaller blade sections together, such as by providing a number of smaller blades adjacent to one another. Multiple blade sections can provide a single edge with sections that can be replaced independently of other sections.

The cutting drum preferably has at least one channel. Each channel may be associated with one or more cutting implements. Each channel is preferably disposed adjacent to one cutting implement so that the channel can receive reduced material from said cutting implement and more preferably precedes the cutting implement as measure by the direction of drum rotation. As shown, the channels are elongated, radially outwardly opening depressions or cups that have a set of walls and a floor which form a channel basin. The at least one channel may open at one end of the channel. In certain embodiments the at least one channel opens at the end of the drum, and preferably at the drum end that has the greatest diameter. In other embodiments it was found that the at least one channel does not have to open at either end, and may be at least partially blocked. Each channel may present a concave radially outwardly facing cross sectional configuration so as to trap reduced material on the outer surface of the drum and preclude the passage of reduced material radially inwardly into the drum into the interior of the drum. The channel preferably widens and/or deepens towards a wider end (or the end with a greater diameter) of the drum. A channel that widens and/or deepens toward the wider end of the drum is better suited for releasing reduced material without plugging. Each channel preferably has a floor or basin that is imperforate to reduced material. In a preferred embodiment each channel is disposed prior to the associated cutting implement (as measured in relation to the cutting blade and direction of drum rotation). In one embodiment the at least one channel extends the length of a cutting region, drum section or the entire cutting drum and opens at the end of the drum. In another embodiment the channel only extends the length of the associated cutting implement. The at least one channel preferably has at least one end that is blocked and may have both ends blocked. The channel may be blocked by any suitable blocking device or block, such as a wall, butt plate, blank, etc. The blocking device or block is preferably a butt plate supported by the drum. The butt plate is preferably attached to the drum at a narrower end thereof. The at least one channel may open at one end to at least temporarily communicate with a material flow chamber. The distance of the channel basin from the axis of rotation preferably increases along the channel from the narrower end to the wider end of the drum. A channel having an increasing distance from the axis of rotation allows reduced material to be accelerated with increasing speed as the material is directed towards the end of the drum, which can reduce plugging or enhance discharge.

The shredder preferably has a butt plate. The butt plate provides a surface for incoming material, such as branches or logs, to impinge against so that the cutting implements may engage incoming material without the incoming material slipping along the incline of the drum off to the side of the drum and into the housing. The butt plate is preferably coupled to the cutting drum at a narrower section of the cutting drum, which may be the end of the drum. The butt plate may be coupled with the cutting drum in any suitable manner, such as made integral therewith, attached with fasteners, welded thereto, etc. The butt plate preferably extends beyond the outer circumference of the section of the drum that the butt plate is attached, i.e. has a circumference or diameter that exceeds the circumference of the section of the drum that the butt plate is coupled. The butt plate is not fixed to any particular shape and may be a disc, ring, polygonal plate, triangular, block of metal, etc. The butt plate may be attached to the drum and may be partially enclosed by a butt plate housing. In a preferred embodiment, the butt plate is also a flywheel. A flywheel butt plate may provide a surface for incoming material to impinge upon while increasing the inertia of the cutting drum.

The shredder preferably has at least one impeller and more preferably a plurality of impellers joined with the cutting drum. The impeller(s) may be formed of any suitable material, such as an alloy, composite, plastic, etc. Preferably, the shredder has three or more impellers, four or more, five or more, or six or more impellers disposed on a flywheel or on the end of the drum to aid in reduced material discharge. The impeller(s) may aid in reduced material discharge by providing airflow through the discharge assembly and may also act as paddles to directly move and throw material that comes into contact with the impellers. The impellers are preferably evenly spaced about the outer side(s) of the cutting drum, drive shaft, or flywheel(s). Preferably, one or more of the impellers closely follow one or more of the channel(s) of the drum. The impellers preferably act to generate air currents when the drum rotates. Preferred arrangements include impellers positioned at 12, 3, 6 and 9 o'clock of the drum or flywheel. Extra impellers may also be added at 1 and 7 o'clock, etc. Extra impellers are preferably added in a manner that increase discharge efficiency while keeping rotational balance of the device they are mounted to, such as the drum or the flywheel. The impellers are preferably formed, sized and angled for the type of material that the impellers are to move.

The shredder preferably includes a bellyband. A bellyband provides a device for trapping reduced material in the channel (s) or on the surface of the cutting drum and generally allows material to be carried radially with the cutting drum during operation over some travel distance of the cutting drum. The bellyband preferably conforms to the shape of the cutting drum. The bellyband preferably wraps the cutting drum beginning at about the anvil and extends around the drum in the direction of drum rotation. The bellyband preferably forms part of a closed loop around the drum. The bellyband may wrap almost all the way around the drum or may only wrap as much as is necessary to keep material in the channels long enough so that at least the majority of material is discharged to the side of the drum before the bellyband ends.

In a preferred embodiment, where the cutting drum is tapered, the bellyband is preferably cupped with a wider region and a narrower region and formed in a shape that conforms with the shape of the tapered cutting drum. In the case where the cutting drum is tapered towards the middle or towards both ends, the bellyband is preferably cupped and formed with a multi-sided, and/or multi angled front wall that conforms to the angle of the tapered drum. For example, if the drum is 'hourglass' shaped, the bellyband will have a double-cupped housing or wall to accommodate the shape of the hourglass cutting drum in fairly uniform and close tolerance. The double-cupped bellyband may have a wider outer region and a narrower inner region to accommodate the bulbs of the hourglass. The space between the bellyband and the cutting drum is preferably uniform or substantially uniform along the length and width of the bellyband. The clearance or conformance of the bellyband to the cutting implements is preferably small, such as ⅛th of an inch or less and more preferably 1/16th of an inch or less. A small clearance of uniform dimension allows material or chips to be effectively carried radially with the drum so that they may flow in the channel(s) to the side of the drum.

The shredder preferably has a housing disposed around the cutting drum. The housing preferably encloses at lease part of the cutting drum. The housing may include a frame, supports, panels, hood, cap, bearings, bellyband, chamber, etc. The housing preferably encloses the cutting drum to contain flying debris. The housing may be shaped in close proximity to the drum for trapping reduced material in the channel(s) or on the surface of the cutting drum to generally allow material to be carried radially with and transversely across the cutting drum during operation over some travel distance of the cutting drum. In a preferred embodiment the housing may be formed to open with a greater volume from a smaller diameter portion of the drum to a larger diameter portion of the drum. Having a housing formed to open with a greater volume from the smaller diameter portion of the drum to the larger diameter portion of the drum may allow more efficient travel of reduced material to the end(s) of the drum. The housing may only cover part of the drum and thereby act as a hood. The bellyband may be coupled with the hood to complete a closed loop. An access panel may be provided in the hood so that the cutting drum can be accessed through the housing.

The shredder preferably includes an anvil. An anvil is any hard object that provides an edge that cooperates with the one or more cutting implements to help reduce material. The anvil may be a single piece or may be made up of a plurality of pieces. The anvil may be connected to the housing, removably connected to the housing or formed integral therewith. The anvil may be disposed adjacent to the cutting drum, extend along the cutting axis, and may be separated from the drum by a gap sufficient to allow drum rotation. Preferably, the anvil is a plate, which is removably mounted to the housing or other support. The anvil(s) may be translatable or movable. A translatable anvil allows the distance between the anvil and cutting drum or cutting implements to be adjusted, which may be used to regulate the size of reduced material or create a more consistent end product.

The anvil is preferably curved, such as concave or with a curved edge. A curved anvil allows a tighter tolerance with the cutting implements of a tapered cutting drum. The anvil is preferably curved to provide a substantially even or uniform distance or gap between the cutting implements (which may be straight and mounted to a tapered drum) and more preferably along substantially the entire length of each corresponding cutting implement. Thus, if the cutting implements are elongated, straight, blades mounted to a tapered cutting drum, the blades can still pass in close proximity to the curved anvil along the entire length of the cutting region.

The shredder preferably includes a drive connected to the cutting drum. A drive is any device that provides rotation and power to the drum. The drive may include a drive shaft and a power source. The drive shaft may be connected to the power source by any suitable drive means, such as a belt drive, chain drive, electric drive, hydraulic drive, etc. Suitable power sources include electric motors, hydraulic systems, diesel engines, gas engines, etc. The cutting drum may also be supported by a stub shaft. The stub shaft may be disposed at an end opposite the drive shaft to aid in further support of the cutting drum. The stub shaft in turn may be supported by any suitable means, such as by the housing, a frame, associated brackets, etc. The drive shaft may include a key or cutout to lock the drive shaft to a connector.

The shredder preferably includes a flywheel joined with the cutting drum. A flywheel is anything outside the cutting region of the drum that adds significant momentum or adds measurably to the kinetic energy of the cutting drum. The flywheel is material other than impellers, cutting implements and associated hardware, drum skin, drive shaft. The flywheel preferably has material that extends past the outer most circumference of the cutting drum. As may be appreciated by the disclosure herein, the further the flywheel material is displaced from the center of rotation, the more inertia gained.

The flywheel may be a ring, plate, flange, rim with spokes, or other suitable momentum increasing device that is joined with the cutting drum. The flywheel may be joined with the drum in any suitable manner, such as fastened directly to the cutting drum, supported by the cutting drum, supported by and connected to a drive shaft that is connected to the cutting drum, or may be made integral with the cutting drum. The flywheel may be made integral with the cutting drum by forging or casting the two as one piece. A flywheel made integral with the drum may take on the form of a radially extending flange on the end of the drum. In the case where the flywheel is made integral with the drum, the flywheel may be considered anything positioned past the outer most portion of the cutting region or past the outer tip of the knife and anything larger than that becomes the flywheel. The flywheel preferably adds at least 10% to the momentum or the inertia of the cutting drum. The flywheel is preferably disposed in the material flow chamber or the discharge assembly. The flywheel may be disposed in the middle, or at either side of the material flow chamber. Preferably the flywheel is disposed at one side of the material flow chamber with impellers attached to the side facing the inside of the material flow chamber. The fly wheel may be attached to impellers which in turn are attached to and supported by a drum.

In certain embodiments, the flywheel preferably includes one or more passages for reduced material to pass. Each passage preferably opens proximate and preceding the at least one cutting implement. Each passage may taper no more than 45 degrees radially to the outermost edge of the flywheel. The passage is preferably open to receiving material from a channel in the drum and more preferably travels with the channel. The passage preferably opens to a sizing chamber.

The shredder has a sizing chamber for more uniformly sizing material. A sizing chamber is any device suitable for receiving reduced material from the reducing element and creating more uniformly sized material. The sizing chamber includes at least one screen for more uniformly sizing material. A sizing screen provides means for sizing reduced material. The sizing chamber is preferably disposed adjacent to the reducing chamber and in material transfer communication with the at least one channel of the cutting drum. The sizing chamber may include a housing at a side of the cutting drum that is open to the drum for receiving reduced material. The sizing chamber preferably opens to a transition or directly through a discharge port. The sizing chamber is preferably sized to accommodate the flywheel and/or impeller(s) within. The sizing chamber may include a rounded, smooth inner surface. The inner surface of the sizing chamber preferably includes a circumference or diameter that is greater than the circumference of the cutting drum at the cutting drum's widest diameter. The inner surface of the sizing chamber preferably breaks or discontinues at a discharge opening. The inner surface of the sizing chamber is preferably sized to accommodate the discharging impellers and their rotation within a tight tolerance or a tolerance suitable to move material without leaving a majority of the material behind.

The impellers may be classified in two different categories, impellers that precede a screening operation and ones that precede a discharge operation without screening. Impellers that precede a screening operation may be called screening impeller(s). Impellers that do not precede a screening operation may be termed discharge impeller(s). Both the screening impeller(s) and the discharge impeller(s) are preferably positioned at least partially in the sizing chamber. The impellers are preferably rigid or thick enough to handle both contacting and pushing reduced material and large enough to generate substantial air flow through the shredder to draw reduced material into the chamber and out of the shredder. The discharge impellers preferably extend past the outer most circumference of the drum or drum skin. The screening impellers may be shaped or have a reducing element added thereto to help further reduce already reduced material, e.g. reducing impeller(s).

Sizing of material is provided at least in part by one or more sizing screens. The sizing screens have a series of holes of a size for limiting larger material from passing there though. The sizing screens may be fixed in position relative to the support. The sizing screens may be arched. The sizing screens may form a ring. Rings of greater diameter may be provided to provide multiple screening operations. The screen or screen sections are preferably removable. The screen may be made-up of a series of arched segments that can be individually replaced, substituted for a different screen mesh, or completely removed. A screen which can be replaced with a screen of a different screen mesh is an "optional" screen. The removable screen is preferably removable without opening any housing or hood covering the cutting drum.

The sizing chamber may lead to a discharge assembly. The discharge assembly may include a transition. A transition is a structure or housing that allows reduced material to be guided away and/or upward or downward from the cutting drum to be eventually discharged from the shredder. The transition preferably tapers along some length and is in communication with a discharge port. The transition may also be connected to an extension or discharge chute that may allow further control of the discharge stream. The transition may include a series of walls, such as sidewalls, a front wall and a rear wall. The sidewalls and/or front and/or rear walls of the transition may be slanted inward. Proper slanting of the transition allows for effective narrowing of the discharge stream without excessive loss in material momentum.

The claimed invention may be better understood with reference to the following preferred embodiment(s).

Figure 2:
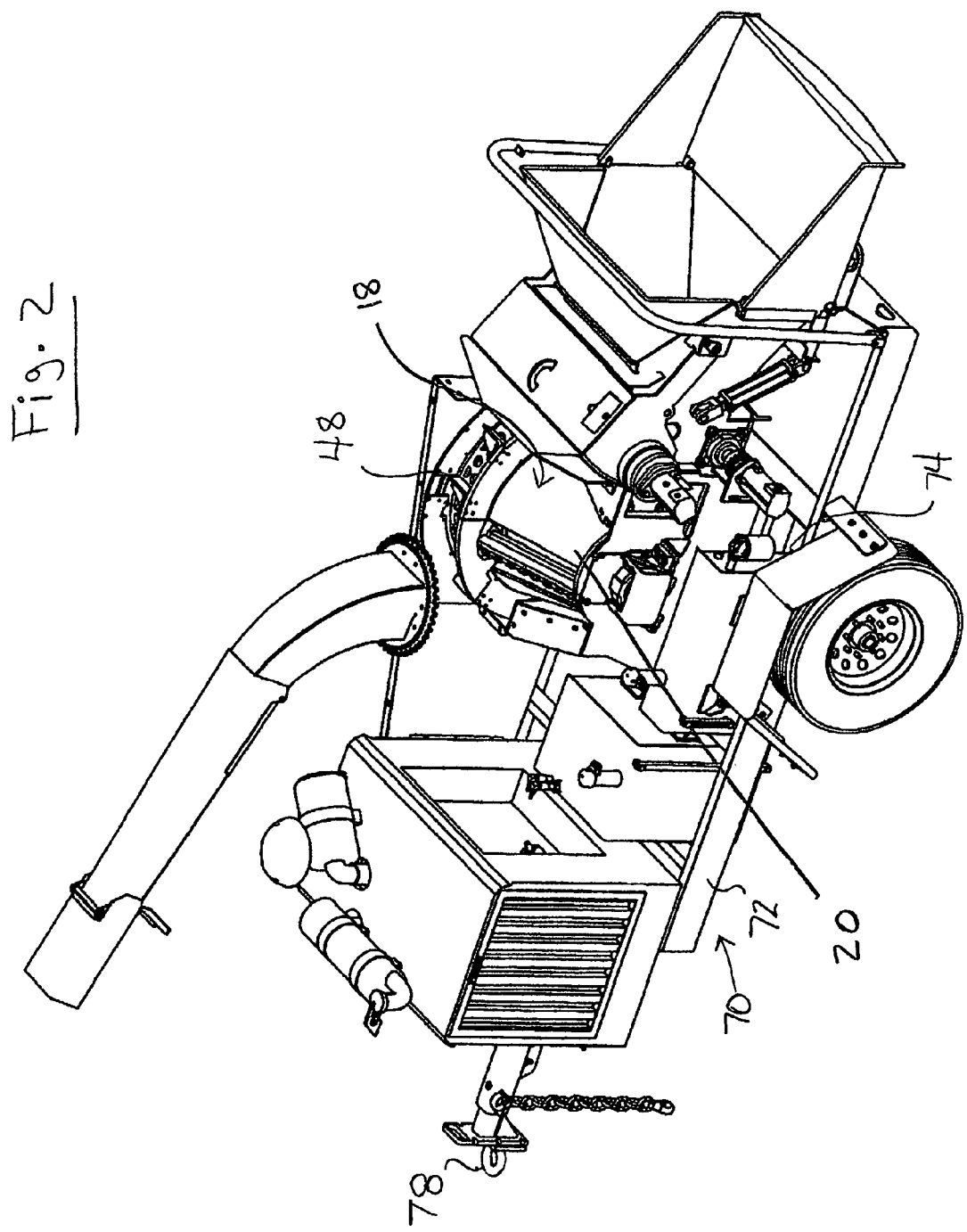
FIG. 2 is an environmental, perspective view of an embodiment of a machine as in FIG. 1 with parts of the assembly removed for ease of viewing.

FIGS. 1-4 depict a preferred embodiment of a shredder 10 having a reducing chamber 12 and a sizing chamber 14. As shown there is a common drive 16 for powering the reducing operation in the reducing chamber 12 and the sizing operation for more uniformly sizing material in the sizing chamber 14.

The reducing chamber 12 includes at least one reducing element 18. As shown the reducing element 18 includes a tapered cutting drum 20, a plurality of impellers, at least one channel, and a flywheel 22.

As configured, the shredder 10 is particularly suitable for chipping wood and other fibrous materials. The shredder 10 includes a feed limiter roller 80 mounted in the in-feed 24. A feed limiter roller controls how unprocessed material is delivered to the cutting drum. In practice unprocessed material is delivered to the in-feed 24, reduced by the cutting drum 20, passed through the sizing chamber 12, screened, and expelled through the discharge assembly 26.

The tapered cutting drum 12 is supported by a support 13. The tapered cutting drum 12 as shown is conical with at least one cutting implement 32 and at least one channel 24. The cutting implement 32 as shown is a cutting blade. The cutting blade is removably mounted on a keeper 36. The channel 34 is open to the surface of the drum, is open on one end 38 and has a basin 40 that is impervious to reduced material. At the smallest diameter end of the drum, the drum has a butt plate 42. At the larger diameter end of the drum, the drum has a flywheel 22. To help effect material reduction the cutting drum 20 interacts with an anvil disposed adjacent thereto (not shown).

As shown, the flywheel 22 is a plate joined to the drum and has material which extends past the outermost circumference of the drum to significantly add to the inertia of the cutting drum. The flywheel as shown has at least one passage to allow material transfer from a corresponding channel to the sizing chamber (See about element number 38 for an example).

The cutting element 18 has a plurality of screening impellers 44, 46, (and others) connected thereto. The screening impellers reside at least partially within the sizing chamber. The cutting element 18 also has a plurality of discharge impellers 48, 50 (and others) connected thereto.

The sizing chamber 14 is open to the cutting drum 12 to receive reduced material from the channel(s) 24 of the cutting drum 12. In this embodiment, the sizing chamber includes a first series of impellers, a sizing screen 90 disposed down stream from the first series of impellers, and a second series of impellers. As shown the first and second series of impellers are connected to and rotate with the drum 12.

The sizing screen 90 is arched to form a ring with an inside region 92 and an outside region 94. The sizing screen 90 has a series of holes 96', 96" of a size for limiting larger material from passing there though. The sizing screen is removably fixed in position relative to the support by a series of removable fasteners 98', 98". The sizing screen is made up of a plurality of screen sections 100, 102. The segments can be individually replaced, substituted for a different screen mesh, or completely removed as such there is an "optional" screen. The screen 90 is independent from the housings 82 and 84 and is removable without the need to remove either hood covering or the sizing chamber housing.

The sizing chamber leads to a discharge assembly 26. As shown, the discharge assembly 26 includes a transition 60, a discharge chute 62, and a discharge port 64 all in material transfer communication with each other. To effect material discharge the impellers residing downstream from the screen rotate with the cutting drum 20 in a manner to move material through the transition by generating air current and by physical contact with the material to push and blow material into the discharge chute and out the discharge port.

The shredder for reducing and sizing material may be mobile, as such and as shown, the material reducing and sizing assembly maybe supported on a trailer 70 having a frame 72, an axel 74 tied to the frame 70, wheels 76 (one of which is shown) supported by the axel 74 and a hitch 78 attached to the frame 72.

The shredder 10 includes a reducing chamber housing 82 disposed around the cutting drum. The housing 82 includes a tapered hood for partially enclosing the cutting head. The housing may also include a bellyband (not shown) that cooperates with the hood to form a closed loop around the drum with an opening to the side. The shredder 10 includes a sizing chamber housing 84 disposed around the sizing chamber and open to the reducing chamber.

As may be appreciated by the disclosure herein, various other shapes of cutting heads having a tapered cutting drum may be used in accordance with the teachings of this disclosure with simple modification, such as by making the shredder a mirror image of one side, as may be the case with the use of an hour-glass shaped cutting head.

While the invention has been illustrated in the foregoing description, the same is to be considered as illustrative and not restrictive in character. For example the shredder of the present invention may be adapted for shredding tires, appliances, etc, with only slight or no modifications to the invention hereof. Therefore, it should be understood that only the preferred embodiments have been shown and described fully and that all changes and modifications that come within the spirit and scope of the claimed invention are desired to be protected.

What is claimed is:

1. A self-contained shredder assembly for reducing and sizing material without the need for an auger or a conveyor to move material between cut and sizing operations comprising: a support; a tapered cutting drum that is impervious to reduced material passing to the interior of the cutting drum, the tapered cutting drum rotatably mounted about the support and having at least one cutting implement; the cutting drum including at least one channel or pocket adjacent to the cutting implement to receive reduced material there from, the at least one channel or pocket being open at the surface of the drum and having a basin that is impervious to reduced material passing to the interior of the cutting drum; a drive connected to the tapered cutting drum; a sizing chamber disposed adjacent to the tapered cutting drum and in material flow communication with the at least one channel or pocket; at least one impeller joined with the tapered cutting drum; at least one sizing screen disposed down stream from and surrounding the at least one impeller, the at least one impeller and the at least one sizing screen each residing at least partially within the sizing chamber.

2. The self-contained shredder assembly for reducing and sizing material without the need for an auger or a conveyor to move material between cut and sizing of claim 1, wherein the at least one impeller is disposed to a side and beyond an end of the tapered cutting drum.

3. The self-contained shredder assembly for reducing and sizing material without the need for an auger or a conveyor to move material between cut and sizing of claim 1, further comprising at least one second impeller at least partially disposed within the sizing chamber and connected to the drum, the at least one second impeller being positioned down stream from the sizing screen.

4. The self-contained shredder assembly for reducing and sizing material without the need for an auger or a conveyor to move material between cut and sizing of claim 1, wherein the screen is removable from the side of the shredder without removing the housing covering the cutting drum.

5. The self-contained shredder assembly for reducing and sizing material without the need for an auger or a conveyor to move material between cut and sizing of claim 1, wherein the screen includes a series of removable arched segments disposed to the side of the cutting drum.

6. The self-contained shredder assembly for reducing and sizing material without the need for an auger or a conveyor to move material between cut and sizing of claim 1, further comprising a flywheel disposed between the cutting drum and the at least one impeller.

7. The self-contained shredder assembly for reducing and sizing material without the need for an auger or a conveyor to move material between cut and sizing of claim 1, wherein the channel is open to discharge material to the side of the cutting drum and into the sizing chamber.

8. The self-contained shredder assembly for reducing and sizing material without the need for an auger or a conveyor to Move material between cut and sizing of claim 1, wherein the cutting drum and sizing chamber are supported on a trailer.

9. The self-contained shredder assembly for reducing and sizing material without the need for an auger or a conveyor to move material between cut and sizing of claim 1, wherein the cutting drum and the sizing chamber are supported on the same support structure.

10. The self-contained shredder assembly for reducing and sizing material without the need for an auger or a conveyor to move material between cut and sizing of claim 1, wherein the screen has an inside pre-screened region and an outside post-screened region, the at least one channel open to the inside pre-screened region and closed to the outside post-screened region.

11. The self-contained shredder assembly for reducing and sizing material without the need for an auger or a conveyor to move material between cut and sizing of claim 10, wherein the screen is at least part of a ring, the inside of the ring forming the inside prescreened region.

12. The self-contained shredder assembly for reducing and sizing material without the need for an auger or a conveyor to move material between cut and sizing of claim 1, wherein the at least one impeller is shaped to reduce material and force the reduced material through the at least one screen.

13. The self-contained shredder assembly for reducing and sizing material without the need for an auger or a conveyor to move material between cut and sizing of claim 1, wherein the screen is arched and is disposed outside the radius formed by the basin of the channel over a rotation of the drum.

14. A shredder for reducing material comprising: a support; a reducing chamber, a tapered cutting drum rotatably mounted about the support and disposed in the reducing chamber, the tapered cutting drum having at least one channel for receiving reduced material, the at least one channel having a basin; at least one cutting implement disposed about an outer surface of the cutting drum for reducing material; and a sizing chamber in communication with and disposed to the side of the cutting drum, the sizing chamber including: at least one impeller connected to the tapered cutting drum, a screen downstream from the impeller, the at least one impeller positioned to force reduced material through the screen during operation, wherein the basin of the channel is impervious to reduced material to prevent such material from passing to the drum interior and to maintain momentum of moving the material until the material enters the sizing chamber.

15. The shredder of claim 14, wherein the screen is arched around the at least one impeller.

16. The shredder of claim 14, wherein the sizing chamber further includes at least one second impeller disposed down stream from the sizing screen.

17. The shredder of claim 16, wherein the at least one impeller is positioned on the inside arch of the screen and the at least one second impeller is positioned on the outside arch of the screen.

18. The shredder of claim 14, wherein the cutting drum is conical and has a smaller diameter end and a larger diameter end, the sizing chamber being positioned off of the larger diameter end of the cutting drum.

19. The shredder of claim 14, further comprising a housing wrapping the tapered cutting drum to define a closed loop around the drum so that material can only escape to a side of the cutting drum and into the sizing chamber.

* * * * *